Figure 1:
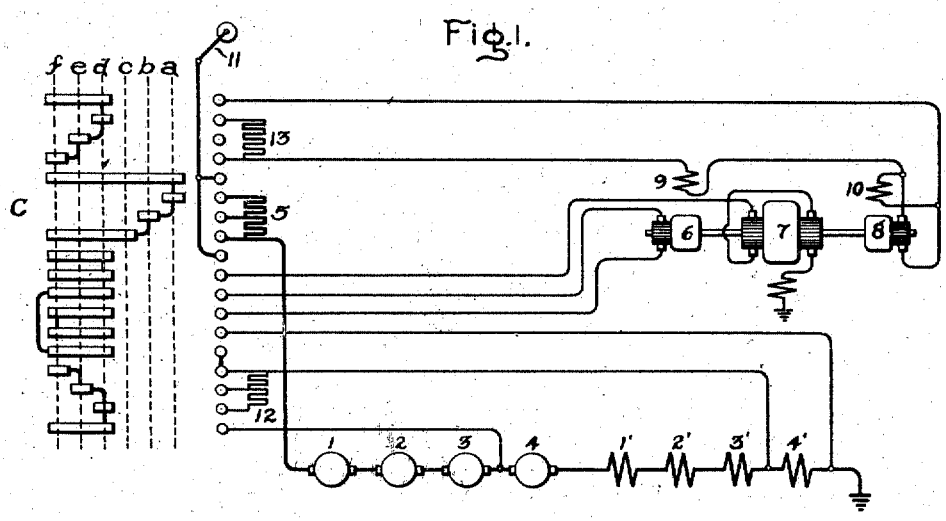

G. H. HILL, DEC'D.

GENERAL ELECTRIC COMPANY, ASSIGNEE.

REGENERATIVE BRAKING.

APPLICATION FILED DEC. 15, 1919.

Reissued Apr. 26, 1921. 15,094.

General Electric Company,
Assignee of Inventor:
George H. Hill, Deceased,
by Albert G. Davis
Attorney.

UNITED STATES PATENT OFFICE.

GEORGE H. HILL, DECEASED, LATE OF SCHENECTADY, NEW YORK, BY GENERAL ELECTRIC COMPANY, A CORPORATION OF NEW YORK, ASSIGNEE.

REGENERATIVE BRAKING.

15,094. Specification of Reissued Letters Patent. Reissued Apr. 26, 1921.

Original No. 1,281,959, dated October 15, 1918, Serial No. 120,667, filed September 18, 1916. Application for reissue filed December 15, 1919. Serial No. 345,031.

*To all whom it may concern:*

Be it known that GEORGE H. HILL, deceased, late of Schenectady, in the county of Schenectady, State of New York, during his lifetime invented certain new and useful Improvements in Regenerative Braking, and that the GENERAL ELECTRIC COMPANY, a corporation organized and existing under the laws of the State of New York, assignee of GEORGE H. HILL, now deceased, hereby declares to the best of its knowledge and belief that the following specification, taken in connection with the accompanying drawing, forming a part of the same, is a clear, true, and complete disclosure of said invention.

The invention relates to the control of electric motors and has for its object the provision of improved means whereby an electric motor may be started, stopped and generally controlled in a reliable, safe and efficient manner.

More specifically, the invention relates to the control of direct current motors, one of the objects being to provide improved means whereby an electric motor may be retarded by causing it to act as a generator to return energy to the line. While the invention is of general application in the field of motor control, it is particularly applicable to electric traction systems. In the operation of trains on heavy grades, one of the great problems is the braking of the train. In some instances with the uusual air brakes on long grades, brake shoes will be overheated or destroyed in a single trip. The wear on the rails is also a matter of serious consideration. Furthermore, trouble is oftentimes caused by overheating the wheels. It has heretofore been proposed to brake electrically operated trains at least in part by causing the motors to act as generators and return energy to the line, a form of braking commonly known as "regenerative" braking. Certain difficulties, however, have been encountered in the use of such systems by reason of the almost universal use in traction work of series motors which are not satisfactory for regenerative braking, if operated as straight series generators, because of their unstable characteristics under conditions of variable speed or variable line voltage. Various arrangements have been heretofore proposed for overcoming these difficulties, but these have for the most part been quite complicated and expensive and are often objectionable because of the practical difficulties which arise during their operation. The trolley or line voltage of traction systems generally varies over a considerable range, but on a direct current regenerative system this range is very pronounced at times because of the effect which the locomotives or trains have on the voltage. Because of this fluctuating line voltage it has been difficult to keep the regenerative current within safe limits during the braking operation and, at the same time, to permit a desirable speed for the locomotive or train and to have the braking effort entirely under the control of the operator. One of the objects of the invention is to provide an improved control which automatically takes care of the fluctuating line voltage whereby the operator may obtain the desired train speed during the regenerative braking period and the desired degree of braking at all times without danger to the motors or other apparatus due to excessive current.

In carrying the invention into effect, the control of the regenerative braking effect is secured by furnishing excitation which may be variable for a portion of the motors and then using this portion to vary the excitation of the other motors by connecting it in a closed loop with the fields of the other motors, the motors all being operatively connected to the supply circuit. In one form of the invention, variable excitation is furnished for this portion of the motors and this excitation may be obtained in any suitable manner, but it is preferable to obtain it by means of a small generator which is driven by a motor energized from the source of supply for the locomotive or train. The regenerative braking effect is accurately controlled by varying the excitation of this small generator in any suitable manner or by varying a resistance in the closed loop in which the armature of the separately excited portion of the motors and the fields of the other motors are included or by varying both the excitation of this small generator and the resistance in the closed loop. In certain forms of the invention, the portion of the motors which supplies the excitation for the fields of the others carries only the excitation current and is not required to also carry the regenerated current delivered to the supply circuit.

Figure 2:
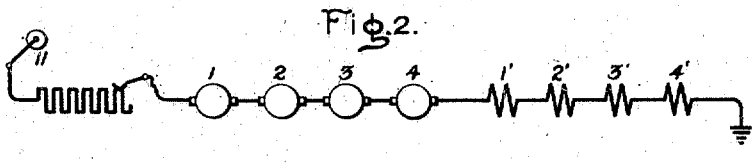
Figure 4:
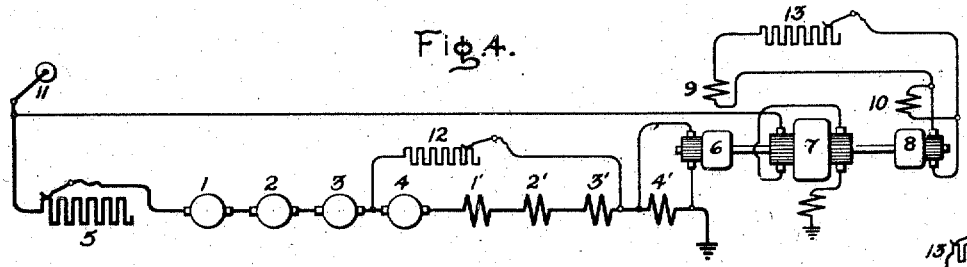
Figure 3:
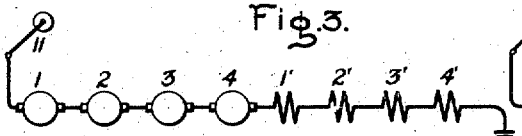
Figure 5:
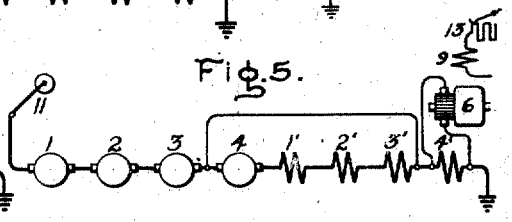
Figure 6:
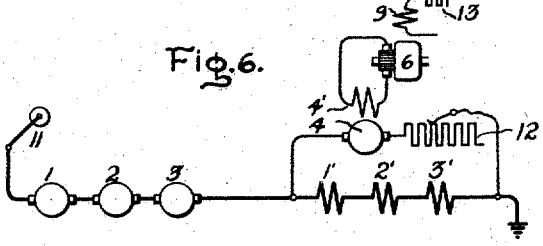

Referring to the drawings, Figure 1 shows a system of motor control embodying the invention; Fig. 2 shows a diagram of circuit connections for the motors on the first point motoring; Fig. 3 shows a diagram of circuit connections for the motors on the last point motoring; Fig. 4 shows a diagram of circuit connections for the motors on the first point of regenerative braking; Figs. 5 and 6 show diagrams of circuit connections for modified systems of regenerative braking embodying the invention.

Referring to Fig. 1, the controller C having a plurality of circuit making contacts is adapted to connect the motors and control apparatus in the various relations as shown in Figs. 2, 3 and 4. The motors having the armatures 1, 2, 3, 4, and series fields 1′, 2′, 3′, and 4′ respectively are adapted to be included in series in all the steps of the control. The variable resistance 5 is adapted to be included in the motor circuits during starting and to be controlled by means of the controller C. The series field 4′ of the motor having the armature 4 is supplied with a separate excitation during the regenerative braking steps in the motor control by means of a generator 6 of a motor generator set having a motor 7 energized from the source of supply. A small generator 8 driven by the motor 7 of the motor generator set is adapted to supply the excitation for the field 9 of the generator 6 and its own shunt field 10.

The operation of this arrangement is as follows:—

When it is desired to start the locomotive or train the controller C is turned to the first point *a* thus connecting all the motors in series with all of the starting resistance 5 included in the circuit, the connection of the motors being as shown in Fig. 2. The circuit at this point is from the trolley pole 11 which is connected to the source of supply, through the controlling resistance 5, the armatures 1, 2, 3, 4, and their respective series fields 1′, 2′, 3′, 4′, to ground. By turning the controller to the position *b* one section of the accelerating resistance 5 is short circuited thus increasing the speed of the motors, and by turning the controller to the position *c* the resistance 5 is all short circuited and the motors are connected directly in series across the line. When it is desired to brake the locomotive or train the controller is moved to the position *d*, when the series field 4′ is given a separate excitation by means of the generator 6 of the motor generator set. At the same time the armature 4 of this motor is connected in a closed loop with the fields 1′, 2′, and 3′ of the other motors. By means of a variable resistance 12, included in this closed loop, the motor 4 may be operated at voltages approximating its normal rated voltage and hence be caused to develop a braking effect approximating that developed by the other motors. The resistance 12, which is traversed by the regenerated current traversing the motors 1, 2, and 3, also functions to limit the fluctuations in the regenerated current, upon sudden variations in the supply circuit voltage, both by varying the portion of the voltage developed by the motors 1, 2, and 3 consumed therein and by varying the portion of the voltage of the motor 4 consumed therein, thereby varying the current in the field windings 1′, 2′, and 3′ and hence the voltage developed by the motors 1, 2 and 3. By varying the resistance 12, the braking effect of the motors 1, 2, and 3 and also of the motor 4 may be varied. A variable resistance 13 in the shunt field of the generator 6 is provided for varying the voltage of this generator and thus the excitation of the field winding 4′. Although means comprising the controller C are shown in Fig. 1 for varying the resistances 12 and 13 simultaneously and in the same sense, the invention is in no way limited to varying these resistances in this particular manner. The circuit connections corresponding to the position *d* of the controller C are shown in Fig. 4. It will be noticed that the connections between the motors and the source of supply have been maintained and that one of the motors, the motor having the armature 4 and series field 4′, is given a separate excitation by means of the generator 6 and the armature of this motor is connected in a closed loop with the series fields of the other motors, together with a resistance 12. In order to increase the regenerative braking effect the controller is moved to the position *e* when a portion of the resistance 12 in the closed loop is short circuited thus causing more current to flow through the closed loop including the armature 4′ and series fields 1′, 2′, 3′, giving these fields a greater excitation. At the same time a portion of the resistance 13 in the shunt field 9 of the generator 6 is short circuited, thus increasing the voltage of this generator and increasing the excitation of series field 4′ and in this way raising the voltage of the armature 4 and increasing the excitation of the series fields 1′, 2′, and 3′. Increasing the excitation of the fields 1′, 2′, and 3′ causes higher voltage to be developed in the armatures 1, 2, and 3, providing the speed thereof does not decrease, and, if the same or a greater current be caused to flow therein, a greater braking effect will be produced thereby. The maximum regenerative braking effect is obtained by turning the controller to the position *f* short circuiting all of the resistances 12 and 13. By reason of the stabilizing action of the resistance 12, it will ordinarily be preferable to operate with a portion thereof effective.

A modified form of the invention is shown in Fig. 5. This system is the same as that shown in Figs. 1 and 4 with the exception that the resistance 12 in the closed loop including the armature 4 and the fields 1′, 2′, 3′ has been omitted. The regulation of the regenerative effect in this system is obtained entirely by varying the excitation of the small generator 6, and the resistance of the closed loop is not varied. An arrangement such as shown in this figure is entirely satisfactory for some situations where the regenerative braking must be controlled, but does not afford such an accurate or safe regulation as that shown in the other figures. In the modifications illustrated in Figs. 1 to 5 inclusive, the armature 4 is not traversed by the current traversing the armatures 1, 2, and 3 and hence the latter may be operated at full current capacity without an overload being imposed upon the armature 4.

Another modified form of the invention is shown in Fig. 6 in which the series connection is maintained between the armatures 1, 2, 3 and their respective series fields 1′, 2′ and 3′ but the armature 4 is disconnected from this series connection and its series field 4′ is also disconnected from the other motors. The series field 4′ is separately excited by means of the generator 6 of the motor generator set running from the line, and the shunt field 9 of this generator is controlled in the same manner as the system shown in Figs. 4 and 5. The control of the excitation of the series fields 1′, 2′, and 3′ may be effected by varying either the resistance 12, or the resistance 13, or both the resistance 12 and the resistance 13. The principal difference between the system of Fig. 6 and that of Figs. 1 to 4 is that, in the system of Fig. 6, the armature 4 is located so that it is traversed both by the current traversing the armatures 1, 2, and 3 and by the current traversing the fields 1′, 2′, and 3′, while in the system of Figs. 1 to 4, the armature 4 is located so that it is traversed only by the current traversing the fields 1′, 2′, and 3′.

The arrangement gives, for some conditions, a more desirable speed control during braking than could be obtained with ordinary systems using four motors in series or an arrangement in which two motors in series are connected in parallel with two others in series. In arrangements using four motors in series which have heretofore been proposed it has been found to be impossible to get a higher speed than a certain value, for instance 20 miles per hour, without weakening the motor fields to such an extent as to render the motors unstable as generators. If the motors were connected two in series in parallel with two others in series it has been difficult to secure a low speed during regenerative braking because of the fact that with such a connection for a speed of, for instance, less than 30 miles per hour, the field current would have to be larger than the windings could stand without overheating. By the arrangement a speed which is midway between the highest safe speed of the four motor series connection and the lowest obtainable speed with the series parallel arrangement may be secured. The arrangement therefore inherently obviates the practical difficultis with those other arrangements which have been heretofore proposed. It will be further noticed that in the arrangement the separately excited motor which is used to furnish the excitation for the fields of the other motors also furnishes its quota of braking effect to retard the speed of the locomotive or train, and with the resistance 12 included in the closed loop, the armature 4 may be working at somewhere near its normal rating. A further advantage of the arrangement is that fluctuations of voltage on the line are automatically taken care of, since the voltage of the generator and the voltage of the armature 4 are responsive to the voltage of the line and thus the regenerative braking is automatically varied in accordance with the line voltage.

In accordance with the provisions of the patent statutes, the principle of operation of the invention has been described, together with the apparatus which is now considered to represent the best embodiment thereof; but it is desired to have it understood that the apparatus shown is only illustrative, and that the invention can be carried out by other means.

What is claimed as new and desired to secure by Letters Patent of the United States, is:—

1. In a system of control, the combination with a supply circuit, of a plurality of dynamo electric machines operatively connected to said supply circuit, one of said machines being also connected to excite another and having a lower average voltage than said other machine.

2. In a system of control, the combination with a supply circuit, of a plurality of similar dynamo electric machines regeneratively connected to said supply circuit, one of said machines being also connected to excite another, and means for producing different voltage ranges upon the respective machines.

3. In a system of regenerative control, the combination of a plurality of similar dynamo electric machines, one of said machines being connected to excite another so as to cause the other to deliver energy to a supply circuit, and a resistor traversed by the current delivered to the circuit for varying the value of the energy thus delivered.

4. In a system of regenerative control, the combination with a supply circuit, of a plurality of dynamo electric machines operatively connected to said supply circuit, one of said machines having its armature connected in series with the field of another machine to operate as an exciter for said other machine, a resistor in the armature circuit of the machine operating as an exciter, and connections whereby the regenerated current traverses the said resistor.

5. In a system of control, the combination with a supply circuit, of a plurality of series wound dynamo electric machines operatively connected to the supply circuit so as to operate as motors to drive a load or as generators to brake the load by delivering energy to the supply circuit, of means for varying the field of one of said machines and connecting its armature in a local circuit with the field of another of said machines so as to operate as an exciter for the other machine, and a resistor in the said local circuit for varying the excitation of said other machine responsively to the variations in the voltage of the supply circuit.

6. In a system of control, the combination with a plurality of series wound dynamo electric machines connected to operate as motors to drive a load or as generators to brake the load by delivering energy to a supply circuit, of means for causing the said machines to operate as generators comprising means for varying the field of one of said machines and connecting the armature of said machine in a local circuit with the field of another of said machines, and a resistor in the said local circuit in series with the armature of said other machine for varying the current in the local circuit.

7. In a system of regenerative braking, the combination of a plurality of similar series wound dynamo electric machines, a portion of the armatures of said machines connected in a local circuit with field windings of the remainder of the machines to operate as an exciter for the remainder of the machines, a resistor in the said local circuit, and connections whereby the resistor controls the excitation of the remainder of the machines responsively to the supply circuit voltage.

8. In a system of control for electric braking, a plurality of similar series wound dynamo electric machines, a resistor, a portion of the armatures of said machines connected in series with the resistor to form a braking circuit, and another portion of the armatures of said machines operating as an exciter for the field windings of the first portion and connected in a local circuit with the resistor.

9. The combination in a system of regenerative control of a plurality of series wound dynamo electric machines operatively connected to a supply circuit, one of said machines having its armature connected in a closed loop with the field of another machine to operate as an exciter for said other machine, and a variable resistance in the closed loop for varying the braking effect.

10. In a system of regenerative control, the combination with a supply circuit, of a plurality of similar dynamo electric machines operatively connected to said supply circuit, one of said machines having its armature connected in a closed loop with the field of another machine to operate as an exciter for said other machine, and a resistor traversed by the regenerated current for varying the current in the said closed loop to vary the regenerated current.

11. The combination in a system of regenerative control of a plurality of similar series wound dynamo electric machines, one of said machines having its armature connected in a closed loop with the field of another machine to operate as an exciter for said other machine, the connections being such that the regenerated current has a path through a portion of the said closed loop in which the armature of the machine operating as an exciter is not included, and a resistor in the said portion of the closed loop for varying the regenerated current.

12. The method of regenerative braking in a system comprising a plurality of similar series wound dynamo electric machines adapted to either drive or to brake a common load, which consists in connecting a portion of the armatures of the machines to a supply circuit through a resistor with the remainder of the armatures of the machines connected in a local circuit to the resistor, operating as an exciter for the said portion of the machines, and then controlling the braking effect by varying the current in the said local circuit.

13. The method of regenerative braking in a system comprising a plurality of similar series wound dynamo electric machines adapted to either drive or to brake a common load, which consists in connecting a portion of the armatures of the machines to a supply circuit through a resistor with the remainder of the armatures of the machines connected in a local circuit to the resistor, operating as an exciter for the said portion of the machines, and then controlling the braking effect by varying the resistor.

14. The method of regenerative braking in a system comprising a plurality of similar series wound dynamo electric machines adapted to either drive or to brake a common load, which consists in connecting a portion of the armatures of the machines to a supply circuit through a resistor with the remainder of the armatures of the machines connected in a local circuit to the resistor, operating as an exciter for the said portion of the machines, and then controlling the braking effect by varying the excitation of the exciter portion of the machines.

15. The method of regenerative braking in a system comprising a plurality of similar series wound dynamo electric machines adapted to either drive or to brake a common load, which consists in connecting a portion of the armatures of the machines to a supply circuit through a resistor with the remainder of the armatures of the machines connected in a local circuit to the resistor, operating as an exciter for the said portion of the machines, and then controlling the braking effect by varying the resistor and varying the excitation of the exciter portion of the machines.

16. The method of regenerative braking in a system comprising a plurality of series motors adapted to drive a common load, which consists in maintaining the connection between the series fields and armatures of a portion of said motors and the source of supply, varying the excitation of another portion of said motors, and connecting said last named portion in a local circuit with the field windings of the first named portion to thereby control their excitation.

17. The method of regenerative braking in a system comprising a plurality of series motors adapted to drive a common load, which consists in maintaining the connection between the series fields and armatures of a portion of said motors and a source of supply, varying the excitation of another portion of said motors to cause this portion to act as a generator, connecting said last named portion in a local circuit with the field windings of the first named portion of the motors, together with a resistance, and in then controlling the braking effect by varying said resistance.

18. The method of regenerative braking in a system comprising a plurality of series motors adapted to drive a common load, which consists in maintaining the connection between the series fields and armatures of a portion of said motors and a source of supply, varying the excitation of another portion of said motors to cause this portion to act as a generator and connecting said last named portion in a local circuit with the field windings of the first named portion of the motors, together with a resistance, and then controlling the braking effect by varying the excitation of the motors operating as generators.

19. The method of regenerative braking in a system comprising a plurality of series motors adapted to drive a common load which consists in maintaining the connection between the series fields and armatures of a portion of said motors and a source of supply, varying the excitation of another portion of said motors to cause this portion to act as a generator, connecting said last named portion in a local circuit with the field windings of the first named portion of the motors, together with a resistance, and in then controlling the braking effect by varying said resistance and varying the excitation of the motors operating as generators.

20. The method of regenerative braking in a system comprising a plurality of series motors adapted to drive a common load, which consists in maintaining the connection between the armatures of said motors and the source of supply, separately exciting a portion of said motors, and connecting said portion in a local circuit with the field windings of the other motors to thereby control their excitation.

21. The method of regenerative braking in a system comprising a plurality of series motors adapted to drive a common load, which consists in maintaining the connection between the armatures of said motors, and a source of supply, separately exciting the field windings of a portion of said motors to cause said portion to act as a generator, connecting said portion in a local circuit with the field windings of another portion of said motors, together with a resistance, and in then controlling the braking effect by varying said resistance.

22. The method of regenerative braking in a system comprising a plurality of series motors adapted to drive a common load, which consists in maintaining the connection between the armatures of said motors and a source of supply, separately exciting the field winding of one of said motors, connecting said separately excited motor in a local circuit with the field winding of another of said motors, together with a resistance, and then controlling the braking effect by varying said resistance.

23. The method of regenerative braking in a system comprising a plurality of series motors adapted to drive a common load, which consists in maintaining the connection between said motors and a source of supply, separately exciting the field windings of a portion of said motors to cause said portion to act as a generator and connecting said portion in a local circuit with the field windings of the other motors, together with a resistance, and then controlling the braking effect by varying the excitation of said separately excited portion of the motors.

24. The method of regenerative braking in a system comprising a plurality of series motors adapted to drive a common load, which consists in maintaining the connection between said motors and a source of supply, separately exciting the field winding of one of said motors and connecting said separately excited motor in a local circuit with the field windings of the other motors, together with a resistance, to cause said motors to act as generators and then controlling the braking effect by varying the excitation of said separately excited motor.

25. The method of regenerative braking in a system comprising a plurality of series motors adapted to drive a common load, which consists in maintaining the connection between said motors and a source of supply, separately exciting the field windings of a portion of said motors to cause said portion to act as a generator, connecting said separately excited portion in a local circuit with the field windings of the other motors, together with a resistance, and in then controlling the braking effect by varying said resistance and varying the excitation of said separately excited portion of the motors.

26. The method of regenerative braking in a system comprising a plurality of series motors adapted to drive a common load, which consists in maintaining the connection between said motors and a source of supply, separately exciting the field winding of one of said motors, connecting the armature of the separately excited motor in a local circuit with the field windings of the other motors, together with the resistance, to cause said motors to act as generators, and in then controlling the braking effect by varying said resistance and varying the excitation of said separately excited motor.

27. In combination, a plurality of motors connected to a common load, means for connecting said motors to a source of supply to drive the load and means for controlling the excitation of one of said motors and connecting the same in a local circuit with the field windings of other of said motors, with the connections between the armature and field windings of said other motors and the source of supply maintained for regenerative braking.

28. In combination, a plurality of series motors connected to a common load, means for connecting said motors to a source of supply in order to drive the load and means for connecting a portion of said motors in a local circuit with the field windings of the other motors, while maintaining the connection of said field windings in series with their armatures to the source of supply, and for varying the excitation of said portion of the motors for controlling the regenerative braking.

29. Apparatus for regenerative braking, comprising a plurality of series motors connected to a common load, means for separately exciting the field winding of one of said motors, means for connecting the armatures of all of said motors and the remaining field windings in series with one another and to a source of supply, and a substantial resistance shunted around said field windings and the armature of that motor which is separately excited.

30. In combination, a plurality of motors connected to a common load, means for connecting said motors to a source of supply to drive the load or for connecting one of said motors as a separately excited generator in a local circuit with the field windings of another of said motors for braking, and for maintaining at all times the connection between the armatures of said motors and the source of supply.

31. In combination, a plurality of series motors connected to a common load, means for connecting said motors to a source of supply in order to drive the load or for connecting one of said motors in a local circuit with the field windings of the other motors, while maintaining the connection of all the field windings in series with their armatures to the source of supply, and for separately exciting said first named motor.

32. Apparatus for regenerative braking, comprising a plurality of series motors connected to a common load, means for separately exciting the field winding of one of said motors, means for connecting the armatures and field windings of all of said motors in series with one another and to a source of supply, and a substantial resistance shunted around the armature of that motor which is separately excited and the field windings of the other motors.

In testimony whereof, the said General Electric Company causes its corporate seal to be hereto affixed and its signature to be hereto affixed by its proper officer.

December 12, 1919.

[L. S.] By GENERAL ELECTRIC COMPANY,
HENRY W. DARLING,
*Treasurer.*